(12) United States Patent
Yang

(10) Patent No.: US 12,402,182 B2
(45) Date of Patent: Aug. 26, 2025

(54) RRC CONNECTION CONTROL METHOD AND APPARATUS, TERMINAL AND ACCESS NETWORK DEVICE

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 790 days.

(21) Appl. No.: 17/762,723

(22) PCT Filed: Sep. 25, 2019

(86) PCT No.: PCT/CN2019/107749
§ 371 (c)(1),
(2) Date: Mar. 22, 2022

(87) PCT Pub. No.: WO2021/056244
PCT Pub. Date: Apr. 1, 2021

(65) Prior Publication Data
US 2022/0353931 A1 Nov. 3, 2022

(51) Int. Cl.
*H04W 76/14* (2018.01)
(52) U.S. Cl.
CPC .................... *H04W 76/14* (2018.02)
(58) Field of Classification Search
CPC ...... H04W 76/14; H04W 74/00; H04W 72/21
USPC .......................................... 370/310
See application file for complete search history.

(56) References Cited

U.S. PATENT DOCUMENTS

| 2014/0136709 A1* | 5/2014 | Chin .................... H04W 4/12 709/226 |
| 2017/0094586 A1 | 3/2017 | Lee et al. |
| 2019/0037475 A1* | 1/2019 | Zhang ................ H04W 76/10 |
| 2019/0254118 A1* | 8/2019 | Dao .................... H04L 67/141 |
| 2021/0058827 A1* | 2/2021 | Holmström ....... H04W 28/0263 |
| 2021/0068120 A1* | 3/2021 | Jung .................... H04W 4/70 |

FOREIGN PATENT DOCUMENTS

| CN | 106105320 A | 11/2016 |
| CN | 109151924 A | 1/2019 |
| CN | 109565831 A | 4/2019 |
| CN | 109640289 A | 4/2019 |
| WO | 2017166221 A1 | 10/2017 |

OTHER PUBLICATIONS

International Search Report of PCT/CN2019/107749 dated May 27, 2020 with English translation, (4p).
First Office Action of Chinese Patent Application No. 201980002149.4 dated Aug. 28, 2020 with English translation (14p).
Huawei, "Overload Control", 33GPP TSG-RAN3 Meeting #99bis, R3-181909, Sanya, China, Apr. 16-20, 2018, (6p).

* cited by examiner

*Primary Examiner* — William Nealon
(74) *Attorney, Agent, or Firm* — Arch & Lake LLP

(57) ABSTRACT

An RRC connection control method is provided. The method comprises: acquiring, by a terminal, a service indication in response to a service request, the service indication being used for indicating a service in which the access network device is capable of allocating resources; and on the basis of the service indication, determining whether to transmit a request for establishing an RRC connection to the access network device.

16 Claims, 4 Drawing Sheets

RRC CONNECTION CONTROL METHOD AND APPARATUS, TERMINAL AND ACCESS NETWORK DEVICE

CROSS REFERENCE

The present application is a U.S. National Stage of International Application No. PCT/CN2019/107749, filed on Sep. 25, 2019, the entire content of which is incorporated herein by reference for all purposes.

TECHNICAL FIELD

The present disclosure relates to the field of communication technologies, and in particular, to an RRC connection control method and apparatus, a terminal, and an access network device.

BACKGROUND

With the development of wireless communication technologies, mobile communication networks gradually evolve to 5G New Radio (NR) systems. In the 5G NR system, the Sidelink technology has been introduced. That is, the terminals communicate with each other directly by wireless resources.

When a terminal uses the Sidelink technology to communicate with other terminals, firstly it needs to establish a Radio Resource Control (RRC) connection with the access network device, and then it requests the access network device to allocate Sidelink resources to communicate with other terminals.

SUMMARY

The embodiments of the present disclosure provide an RRC connection control method and apparatus, a terminal, and an access network device.

According to a first aspect of the present disclosure, an RRC connection control method is provided, the method includes: acquiring a business indication in response to a business request, wherein the business indication indicates a business for which an access network device is capable of allocating resources; and determining whether to send a request for establishing an RRC connection to the access network device based on the business indication.

According to a second aspect of the present disclosure, an RRC connection control method is provided, the method includes: determining a business that is capable of allocating resources based on network load; and sending a business indication, wherein the business indication indicates a business for which an access network device is capable of allocating resources.

According to a third aspect of the present disclosure, a terminal is provided, and the terminal includes: a processor; and a memory, for storing executable instructions of the processor, wherein the processor is configured to load and execute the executable instructions to implement the RRC connection control methods described above.

It should be noted that the above general description and the following detailed description are merely exemplary and exemplary and should not be construed as limiting of the present disclosure.

BRIEF DESCRIPTION OF THE DRAWINGS

The drawings herein are incorporated into the specification and constitute a part of the specification, showing embodiments in accordance with the present disclosure, and are used to explain the principle of the present disclosure together with the specification.

DETAILED DESCRIPTION

Figure 1:
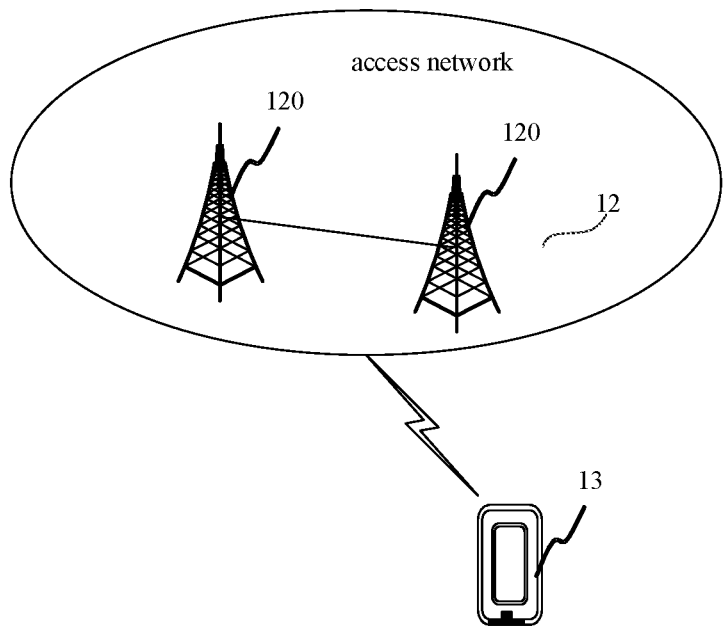
FIG. 1 is a schematic diagram of a network architecture provided by an example of the present disclosure.

The example embodiments will be described in detail here, and examples thereof are shown in the accompanying drawings. When the following description refers to the drawings, unless otherwise indicated, the same numbers in different drawings indicate the same or similar elements. The implementation manners described in the following example embodiments do not represent all implementation manners consistent with the present disclosure. On the contrary, they are merely examples of apparatuses and methods consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 shows a block diagram of a communication system provided by an example embodiment of the present disclosure. As shown in FIG. 1, the communication system may include an access network 12 and a terminal 13.

The access network 12 includes several access network devices 120. The access network device 120 may be a base station. The base station is a device deployed in an access network to provide a wireless communication function for a terminal. The base station may include various forms of macro base station, micro base station, relay station, access point and so on. In systems using different wireless access technologies, the names of devices with base station functions may be different. For example, in LTE systems, they are called eNodeBs or eNBs. In 5G New Radio (NR) systems, they are called gNodeBs or gNBs. With the evolution of communication technology, description of the name "base station" may change. For the convenience of description, the above-mentioned apparatuses which provide wireless communication functions for terminals are collectively referred to as access network devices hereinafter.

The terminal 13 may include various computing devices, wearable devices, vehicle-mounted devices, handheld devices with wireless communication functions, or other processing devices connected to the wireless modem, as well as various forms of user equipment (UE), Mobile Stations (MS), terminal devices, etc. For the convenience of description, the devices mentioned above are collectively referred to as terminals. The access network device 120 and the terminal 13 communicate with each other through certain air interface technology, such as through a Uu interface.

The terminal 13 may establish an RRC connection with the access network device 120 so as to request the access network device to allocate Sidelink resources. The terminal 13 can use the Sidelink resource to communicate with other terminals so as to implement the Sidelink business.

The Sidelink technology of the 5G NR system can be applied to application scenarios such as V2X (Vehicle-to-Everything, Internet of Vehicles). V2X may include: communication of V2V (Vehicle to Vehicle), V2I (Vehicle to Infrastructure), V2N (Vehicle to Nomadic Device), V2P (Vehicle to Pedestrian), etc.

The communication systems and business scenarios described in the embodiments of the present disclosure are for the purpose of illustrating the technical solutions of the embodiments of the present disclosure more clearly, and do not constitute a limitation on the technical solutions provided by the embodiments of the present disclosure. Those of ordinary skill in the art know that with the evolution of communication systems and the emergence of new business scenarios, the technical solutions provided by the embodiments of the present disclosure are also applicable to similar technical problems.

Figure 2:
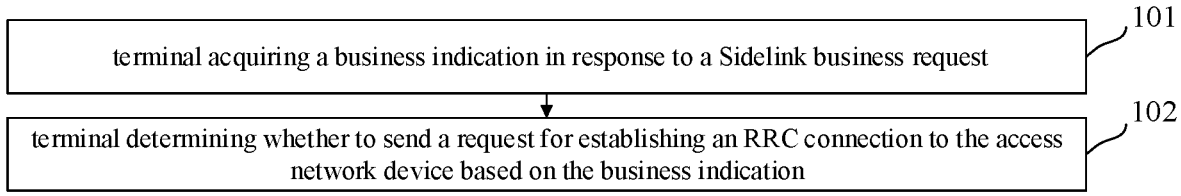
FIG. 2 is a flowchart of an RRC connection control method according to an example of the present disclosure.

FIG. 2 is a flowchart showing an RRC connection control method according to an example embodiment. Referring to FIG. 2, the method includes the following steps.

In step 101, the terminal acquires a business indication in response to a Sidelink business request. The business indication indicates a Sidelink business for which an access network device is capable of allocating resources.

When a terminal needs to perform a Sidelink business with other terminals, a Sidelink business request will be generated. Since the Sidelink business needs the access network device to allocate the Sidelink resources, in some examples, the terminal will directly establish an RRC connection with the access network device, and then the terminal will inform the access network device that the Sidelink resources are needed. However, if the access network device considers that the network load is high and Sidelink resources cannot be allocated to the terminal, the establishment of the RRC connection at this time does not take effect, which wastes the power of the terminal and the access network device, and wastes the network resources.

In order to avoid this from happening, in step 101, the terminal does not directly establish an RRC connection with the access network device, but acquires a business indication first. The business indication can indicate a Sidelink business that the access network device can allocate resources.

For example, when the network load is high, the access network device can only allocate resources for some Sidelink businesses with higher priority or Sidelink businesses with lower latency requirements.

In step 102, the terminal determines whether to send a request for establishing an RRC connection to the access network device based on the business indication.

If the terminal determines, according to the business indication, that the access network device can allocate resources for the Sidelink business, it sends a request for establishing an RRC connection to the access network device.

The request for establishing an RRC connection may be an RRC connection establishment request message or an RRC connection recovery request message.

However, if the terminal determines, according to the business indication, that the access network device cannot allocate resources for the Sidelink business, it will not send a request for establishing an RRC connection to the access network device.

In the embodiment of the present disclosure, when the terminal receives the Sidelink business request, it determines whether the access network device can allocate resources for the Sidelink business according to the business indication. A request for establishing an RRC connection is sent to the access network device only when the access network device can allocate resources for the Sidelink business currently. It reduces the number of instances in the related art in which the access network device is incapable of allocating Sidelink resources to a terminal after the terminal and the access network device establish an RRC connection, and lowers the network resource and power consumption caused by ineffective RRC connections.

The embodiments of the present disclosure take the Sidelink business as an example to describe how to reduce the network resource and power consumption during the resource request. The above method is not only applicable to the Sidelink business, but also applicable to other business, which is not limited in this disclosure. When the method is used for other business, the Sidelink business request in the preceding steps is the other business request. The solutions provided in the subsequent method and apparatus embodiments are also applicable to other business besides the Sidelink business, which will not be described in detail later.

In some examples, determining whether to establish an RRC connection with the access network device based on the business indication includes:

acquiring business information of the Sidelink business;

determining whether the business information of the Sidelink business matches the business indication;

sending the request for establishing the RRC connection to the access network device in response to that the business information of the Sidelink business matches the business indication; not sending the request for establishing the RRC connection to the access network device in response to that the business information of the Sidelink business does not match the business indication.

According to some implementations of the present disclosure, when the terminal receives the Sidelink business request, it can obtain the business information of the Sidelink business based on the Sidelink business request, such as the transmission delay requirement, etc. Based on the transmission delay requirement, and based on the business indication whether the access network device can allocate the corresponding resources, it is determined whether to establish an RRC connection. The determination manner is simple, which ensures that the power consumption of the terminal is low in this process.

When the method is used for other business, the business information of the Sidelink business in the foregoing steps is the business information of other business.

In some examples, the business information includes quality of service (QOS) information of the Sidelink business, and the business indication indicates QOS information of the Sidelink business for which the access network device is capable of allocating resources.

In some implementations, the quality of service information is used as a condition for judging whether there is a corresponding resource, it may ensure that the acquired resource can meet the quality requirement of the business transmission.

Here, the quality of service information usually includes information such as transmission delay, transmission rate, and business priority.

When the method is used for other business, the QOS information of the Sidelink business in the foregoing steps is the QOS information of other business.

In some examples, the business indication includes a list of Proximity QOS Indicators (PQIs) or a list of QOS Flow Indicators (QFIs).

In the embodiment, the PQI indicates the quality of service requirement of the Sidelink business, the PQI list includes several identifiers, and each identifier corresponds to a set of quality of service information. For example, the PQI list is [1, 3], where 1 indicates a business that the delay is in a first range, the rate is in a second range, and the priority is high. If the PQI corresponding to the business information of the Sidelink business is 1, it is determined whether the business information of the Sidelink business matches the business indication, and an RRC connection can be established. If the PQI corresponding to the business information of the Sidelink business is 2, it is determined whether the business information of the Sidelink business does not match the business indication, the RRC connection cannot be established.

Here, the correspondence between the PQI identifier and the business information may be stored in the terminal in advance, and the correspondence is consistent in the terminal and the access network device.

A part of the businesses have the same PQI. The businesses with the same PQI form a QOS Flow. The QOS Flow has one QFI. The QFI list contains several QFIs.

Here, the correspondence between the QFI identifier and the business information may also be stored in the terminal in advance, and the correspondence is consistent in the terminal and the access network device.

In some implementations, the Sidelink business for which the access network device can allocate resources can be indicated through PQI or QFI.

In some examples, the request for establishing the RRC connection includes an RRC initiation reason, and the RRC initiation reason is for requesting Sidelink resources.

In the related art, typically, the RRC initiation reasons carried in the request to establish an RRC connection are among the following reasons: emergency calls, high-priority access, network paging, terminal-initiated signaling, terminal-initiated data, terminal-initiated voice calls, terminal-initiated video calls, terminal-initiated short messages, updating the Radio Access Network (RAN) area, etc.

In this implementation, the reason for initiating RRC is to request Sidelink resources, so that the access network device can determine whether to establish an RRC connection according to the network load, so as to avoid waste of resources caused by unnecessary RRC connections.

For example, in the request for establishing an RRC connection, an identifier or a Sidelink may be used to indicate that the reason for initiating the RRC is to request a Sidelink resource.

Here, the request for establishing the RRC connection may also carry the type of the Sidelink business, business information, PQI or QFI, which is more convenient for the access network device to determine whether to establish the RRC connection.

When the method is used for other business, the request for Sidelink resources in the preceding steps is a request for other business resources.

In some examples, the method further includes:

determining a valid time of the business indication;

determining whether to send the request for establishing the RRC connection to the access network device based on the business indication, in response to that the valid time of the business indication does not expire.

In this implementation, since the network load situation is constantly changing, the business indication provided by the access network device also has a valid time, which can ensure the accuracy of the terminal in determining whether to establish an RRC connection with the access network device, and save resources to the utmost extent.

In the embodiment of the present disclosure, the valid time of the business indication may be implemented by a timer. For example, when the terminal receives the business indication and the valid time of the business indication, the timer is started according to the valid time of the business indication. When the timer expires, it means that the valid time of the business indication has expired. When the timer has not expired, it means that the valid time of the business indication has not expired.

For example, the valid time of the business indication may be 10 seconds, and if the timer exceeds 10 seconds, the business indication is invalid.

In some examples, the method further includes:

receiving at least one of the business indication and a valid time length of the business indication sent by the access network device. In the embodiment, at least one of the business indication and a valid time length of the business indication sent by the access network device means the business indication sent by the access network device, or a valid time length of the business indication sent by the access network device, or both the business indication and a valid time length of the business indication sent by the access network device.

In this implementation, at least one of the business indication and the valid time length of the business indication is sent by the access network device, which can ensure the accuracy of at least one of the business indication and the valid time length of the business indication, thus ensuring the accuracy of the terminal in determining whether to establish an RRC connection with the access network device.

In some examples, receiving at least one of the business indication and a valid time length of the business indication sent by the access network device includes:

receiving a dedicated signaling sent by the access network device, wherein the dedicated signaling includes at least one of the business indication and the valid time length of the business indication; or receiving a broadcast signaling sent by the access network device, wherein the broadcast signaling includes a business indication.

In some implementations, the access network device can use dedicated signaling to transmit the business indication and the valid time length of the business indication. The dedicated signaling is transmitted when the access network device and the terminal have established an RRC connection.

For example, the dedicated signaling includes an RRC reconfiguration message or an RRC connection release message.

The access network device can also transmit the business indication by using broadcast signaling, which does not need to establish an RRC connection. However, since the terminal starts timing after receiving the valid time length of the business indication, transmission by using broadcast signaling cannot guarantee the receiving time of the terminal, which will affect the accuracy of the valid time of the business indication. Therefore, the valid time length of the business indication is not transmitted by broadcast signaling.

In some examples, the method further includes:

acquiring a default business indication, or acquiring a business indication applicable to any Sidelink business in response to receiving no business indication;

acquiring a default valid time length, or acquiring the valid time length with an infinite length in response to receiving no valid time length.

In some implementations, since the access network device may only send one of the business indication and the valid time length of the business indication to the terminal, at this time, the other thereof can use the local default or unlimited business indication or valid time length to perform the above steps to ensure that the above steps can be executed normally.

In some examples, the method further includes:

deleting the business indication received from the access network device when a terminal reselects to another cell, in response to that the valid time of the business indication does not expire.

In this implementation, if the terminal reselects to another cell, it means that the corresponding network load has changed. At this time, the business indication obtained from the access network device is no longer applicable, and the business indication is deleted to ensure the accuracy of subsequent judgments.

If the timer is used as the indication of the valid time of the business indication, the timer is deleted when the terminal reselects to another cell.

In some examples, the method further includes:

deleting the business indication received from the access network device, if the valid time of the business indication expires.

In this implementation, if the valid time of the business indication expires, it means that the business indication obtained from the access network device is no longer applicable, and the business indication is deleted to ensure the accuracy of subsequent judgments.

It should be noted that the foregoing steps 101-102 and the foregoing optional steps may be combined arbitrarily.

Figure 3:
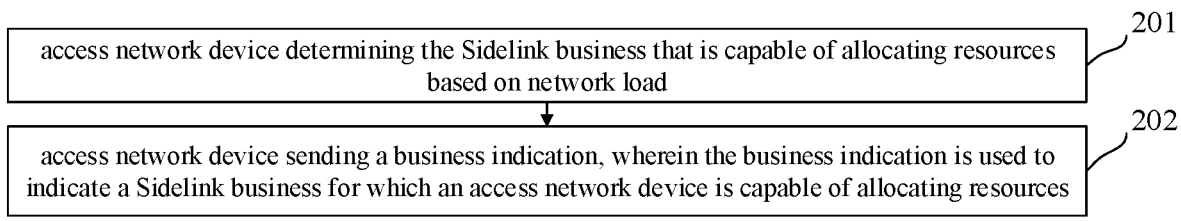
FIG. 3 is a flowchart of an RRC connection control method according to an example of the present disclosure.

FIG. 3 is a flowchart showing a RRC connection control method according to an example embodiment. Referring to FIG. 3, the method includes the following steps.

In step 201, the access network device determines the Sidelink business that is capable of allocating resources based on network load.

For example, when the network load is low, the access network device can allocate resources for various Sidelink businesses. When the network load is high, the access network device can only allocate resources for some Sidelink businesses with higher priority or Sidelink businesses with lower latency requirements.

The correspondence between the storage network load and the Sidelink business that can allocate resources can be implemented in the access network device.

In step 202, the access network device sends a business indication, and the business indication indicates a Sidelink business for which an access network device is capable of allocating resources.

After determining the Sidelink business that can allocate resources in step 201, a business indication is generated based on these Sidelink businesses and sent to the terminal.

In this way, when the terminal receives the Sidelink business request, it determines whether the access network device can allocate resources for the Sidelink business according to the business indication. A request for establishing an RRC connection is sent to the access network device only when the access network device can allocate resources for the Sidelink business currently. It reduces the number of instances in the related art in which the access network device is incapable of allocating Sidelink resources to a terminal after the terminal and the access network device establish an RRC connection, and lowers the network resource and power consumption caused by ineffective RRC connections.

In some examples, the business indication includes a PQI list or a QFI list.

In some examples, sending a business indication includes:

sending a dedicated signaling, wherein the dedicated signaling includes a business indication; or sending a broadcast signaling, wherein the broadcast signaling includes a business indication.

In some examples, the method further includes:

sending a dedicated signaling, wherein the dedicated signaling includes a valid time length of the business indication.

In some examples, the dedicated signaling includes an RRC reconfiguration message or an RRC connection release message.

In some examples, the method further includes:

receiving a request for establishing an RRC connection, wherein the request for establishing an RRC connection includes an RRC initiation reason, and the RRC initiation reason is for requesting Sidelink resources;

determining whether to establish an RRC connection based on the network load;

sending an RRC connection rejection message in response to determining not to establish the RRC connection;

sending an RRC connection consent message in response to determining to establish an RRC connection.

In this implementation, the reason for initiating RRC is to request Sidelink resources, so that the access network device can determine whether to establish an RRC connection according to the network load, so as to avoid waste of resources caused by unnecessary RRC connections.

Here, the request for establishing the RRC connection may also carry the type of the Sidelink business, business information, PQI or QFI, which is more convenient for the access network device to determine whether to establish the RRC connection.

It should be noted that the foregoing steps 201-202 and the foregoing optional steps may be combined arbitrarily.

Figure 4:
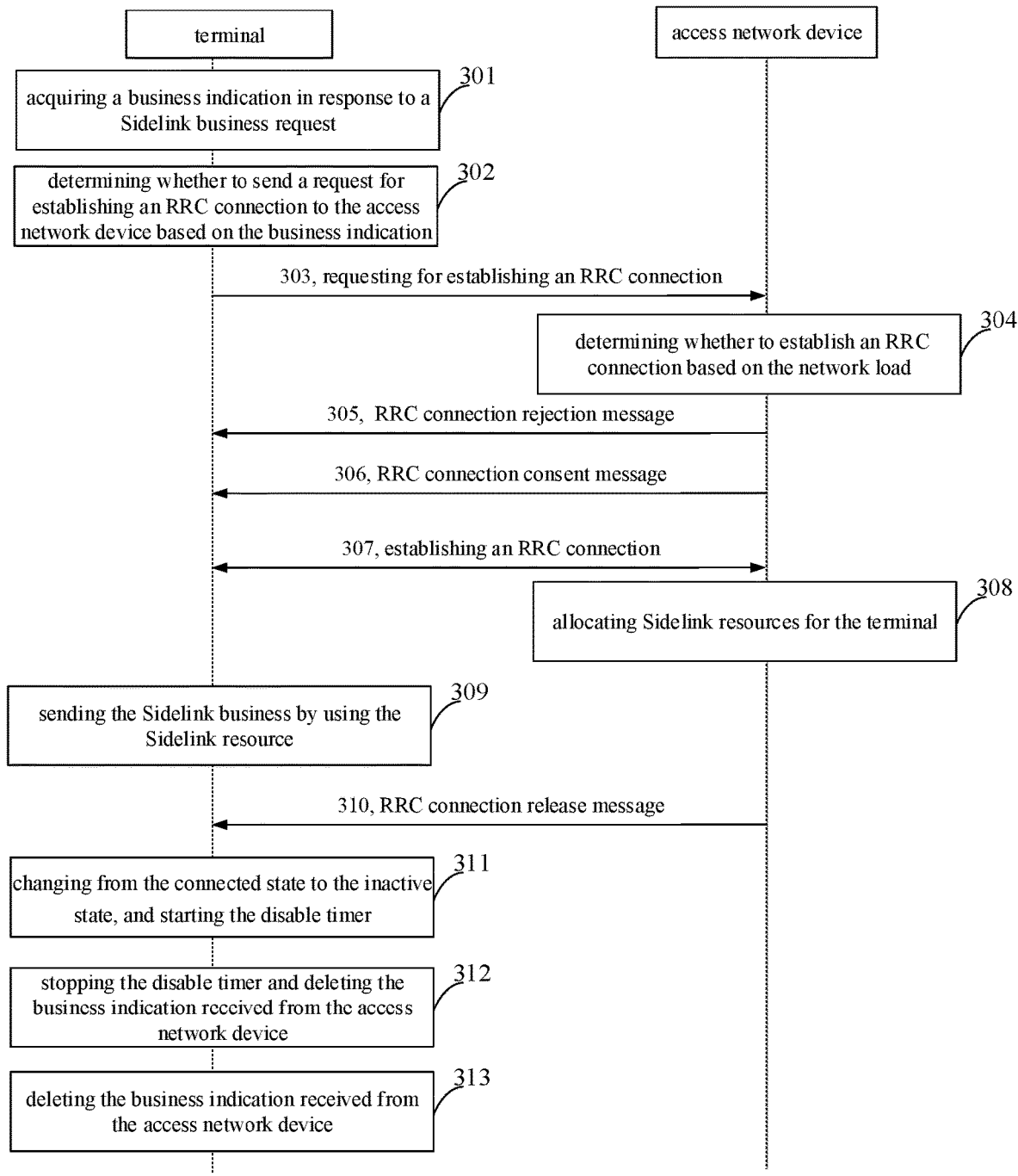
FIG. 4 is a flowchart of an RRC connection control method according to an example of the present disclosure.

FIG. 4 is a flowchart showing an RRC connection control method according to an example embodiment. Referring to FIG. 4, the method includes the following steps.

In step 301, the terminal acquires a business indication in response to a Sidelink business request, wherein the business indication indicates a Sidelink business for which an access network device is capable of allocating resources.

Here, as for the Sidelink business request, reference may be made to step 101, which will not be repeated here.

In step 302, the terminal determines whether to send a request for establishing an RRC connection to the access network device based on the business indication. If the terminal sends a request for establishing an RRC connection to the access network device, the step 303 is performed. If the terminal does not send a request for establishing an RRC connection to the access network device, the process ends.

The business indication in steps 301 and 302 may be the business indication sent by the access network device. At this time, the business indication usually has a valid time. In this case, the valid time of the business indication can be determined first. If the valid time of the business indication does not expire, it is determined whether to send a request for establishing an RRC connection to the access network device based on the business indication. If the valid time of the business indication expires, the business indication cannot be used for the determination, and the default business indication can be used for the determination.

The business indication in steps 301 and 302 may also be default business indication, or business indication with unlimited businesses. For example, when the terminal accesses the network or just completes the cell reselection and has not acquired the business indication sent by the access network device, the default business indication or the business indication of the unlimited business is used to determine whether to perform an RRC connection.

In the embodiment of the present disclosure, when it is determined whether to send a request for establishing an RRC connection to an access network device based on the business indication, if the business indication is a business indication of unlimited business, at this time, no business information is needed, and it can be determined to send a request for establishing an RRC connection to the access network device directly according to the business indication.

If the business indication is a business indication sent by the access network device, or a default business indication, the business indication usually limits a part of the Sidelink business. At this time, determining whether to send a request for establishing an RRC connection to the access network device based on the business indication may include:

acquiring business information of the Sidelink business;

determining whether the business information of the Sidelink business matches the business indication;

sending the request for establishing the RRC connection to the access network device in response to that the business information of the Sidelink business matches the business indication; not sending the request for establishing the RRC connection to the access network device in response to that the business information of the Sidelink business does not match the business indication.

In some implementations, when the terminal receives the Sidelink business request, it can obtain the business information of the Sidelink business based on the Sidelink business request, such as the transmission delay requirement, etc. Based on the transmission delay requirement, and based on the business indication which indicates whether the access network device can allocate the corresponding resources, it is determined whether to establish an RRC connection. The determination manner is simple, which ensures that the power consumption of the terminal is low in this process.

In some examples, the business information includes quality of service (QOS) information of the Sidelink business, and the business indication indicates QOS information of the Sidelink business for which the access network device is capable of allocating resources.

In some implementations, the quality of service information is used as a condition for judging whether there is a corresponding resource, it may ensure that the acquired resource can meet the quality requirement of the business transmission.

Here, the quality of service information usually includes information such as transmission delay, transmission rate, and business priority.

In some examples, the business indication includes a PQI list or a QFI list.

In the embodiment, the PQI indicates the quality of service requirement of the Sidelink business, the PQI list includes several identifiers, and each identifier corresponds to a set of quality of service information. For example, the PQI list is [1, 3], where 1 indicates a business that the delay is in a first range, the rate is in a second range, and the priority is high.

A part of the businesses have the same PQI. The businesses with the same PQI form a QOS Flow. The QOS Flow has one QFI. Thus, the QFI list contains several QFIs.

In step 303, the terminal sends a request for establishing an RRC connection to the access network device. The request for establishing the RRC connection includes an RRC initiation reason, and the RRC initiation reason is for requesting Sidelink resources. The access network device receives a request for establishing an RRC connection.

In some examples, the request for establishing the RRC connection includes an RRC initiation reason, and the RRC initiation reason is for requesting Sidelink resources.

In some examples, the RRC initiation reasons carried in the request to establish an RRC connection are usually: emergency calls, high-priority access, network paging, terminal-initiated signaling, terminal-initiated data, terminal-initiated voice calls, terminal-initiated video calls, terminal-initiated short messages, updating the RAN area, etc.

In this implementation, the reason for initiating RRC is to request Sidelink resources, so that the access network device can determine whether to establish an RRC connection according to the network load, so as to avoid waste of resources caused by unnecessary RRC connections.

Here, the request for establishing the RRC connection may also carry the type of the Sidelink business, business information, PQI or QFI, which is more convenient for the access network device to determine whether to establish the RRC connection.

Steps 302 and 303 may be performed in either an idle state or an inactive state. In the idle state, the request for establishing an RRC connection is an RRC connection establishment request message, and in the inactive state, the request for establishing an RRC connection is an RRC connection recovery request message.

In step 304, the access network device determines whether to establish an RRC connection based on the network load. If it is determined not to establish an RRC connection, the step 305 is executed. If it is determined to establish an RRC connection, the step 306 is executed.

The steps may include: determining whether to establish an RRC connection based on the network load;

sending an RRC connection rejection message in response to determining not to establish the RRC connection;

sending an RRC connection consent message in response to determining to establish an RRC connection.

In this implementation, the reason for initiating RRC is to request Sidelink resources, so that the access network device can determine whether to establish an RRC connection according to the network load, so as to avoid waste of resources caused by unnecessary RRC connections.

In step 305, the access network device sends an RRC connection rejection message. The terminal receives the RRC connection rejection message.

When the terminal receives the RRC connection rejection message, the RRC connection establishment process is stopped.

In step 306, the access network device sends an RRC connection consent message. The terminal receives the RRC connection consent message.

When the terminal receives the RRC connection consent message, it performs a connection establishment process with the access network device.

In step 307, the access network device and the terminal establish an RRC connection.

In step 308, the access network device allocates Sidelink resources for the terminal.

The access network device may allocate Sidelink resources for the terminal based on currently idle resources, the type of Sidelink business, business information, and PQI or QFI of the business.

In step 309, the terminal uses the Sidelink resource to send the Sidelink business.

In step 310, the access network device sends an RRC connection release message to the terminal. The RRC connection release message includes the business indication and the valid time length of the business indication. The terminal receives the RRC connection release message.

When the network load is high, if the Sidelink business transmitted by the terminal does not belong to the business that can allocate resources under the condition of high load, the access network device will no longer allocate Sidelink resources for the terminal. At this time, the access network device sends an RRC connection release message to the terminal. After the RRC connection is established between the access network device and the terminal in step 307, if the network load is high, the access network device may directly perform step 310 without performing step 308 at this time. That is to say, the present disclosure does not intend to completely eliminate the situation of establishing an RRC connection but unable to acquire Sidelink resources, but to reduce the occurrence of such situations by judging the prospect of acquiring Sidelink resources in advance, thus saving resources.

In step 311, the terminal changes from the connected state to the inactive state, and starts a timer.

After receiving the RRC connection release message, the terminal changes from the connected state to the inactive state. At the same time, the business indication in the RRC connection release message is stored.

In the embodiment of the present disclosure, a timer indicates whether the business indication is within the valid time. The timeout time of the timer is set as the valid time length of the business indication. In other embodiments, it can also be implemented in other manners, which is not limited in this disclosure.

When the timer has not expired and the terminal has not reselected to another cell, the foregoing steps 301 to 309 are repeated.

In step 312, if the timer does not expire, when the terminal reselects to another cell, the terminal stops the timer and deletes the business indication received from the access network device.

In step 313, if the timer expires, the terminal deletes the business indication received from the access network device.

Figure 5:
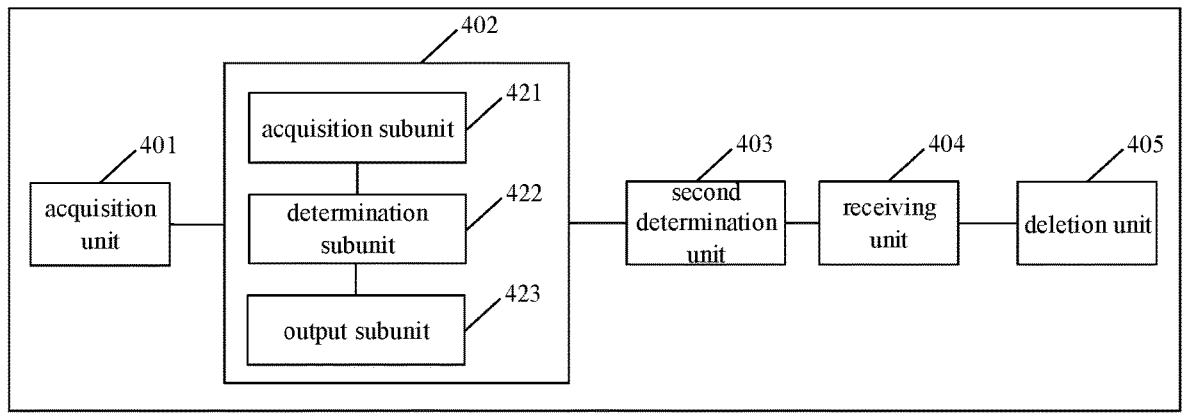
FIG. 5 is a schematic structural diagram of an RRC connection control apparatus according to an example of the present disclosure.

FIG. 5 is a schematic structural diagram of an RRC connection control apparatus according to an example embodiment. The apparatus has the function of realizing the terminal in the above method embodiment. The function may be realized by hardware, or by executing corresponding software through the hardware. As shown in FIG. 5, the apparatus includes an acquisition unit 401 and a first determination unit 402.

The acquisition unit 401 is configured to, in response to a Sidelink business request, determine whether to establish an RRC connection with an access network device based on a business indication, wherein the business indication indicates a Sidelink business for which an access network device is capable of allocating resources.

The first determination unit 402 is configured to send a request for establishing an RRC connection to the access network device if a request for establishing an RRC connection is sent to the access network device.

In some examples, the first determination unit 402 includes an acquisition subunit 421, a determination subunit 422, and an output subunit 423.

The acquisition subunit 421 is configured to acquire the business information of the Sidelink business.

The determination subunit 422 is configured to determine whether the business information of the Sidelink business matches the business indication.

The output subunit 423 is configured to send a request for establishing an RRC connection to the access network device if the business information of the Sidelink business matches the business indication; and not to send a request for establishing an RRC connection to the access network device if the business information of the Sidelink business does not match the business indication.

In some examples, the business information includes quality of service information of the Sidelink business.

In some examples, the business indication includes a list of Proximity QOS Indicators (PQIs) or a list of QOS Flow Indicators (QFIs).

In some examples, the request for establishing an RRC connection includes an RRC initiation reason, and the RRC initiation reason is a request for Sidelink resources.

In some examples, the apparatus further includes a second determination unit 403.

The second determination unit is configured to determine a valid time of the business indication.

The acquisition unit 401 is configured to determine whether to send the request for establishing the RRC connection to the access network device based on the business indication, in response to that the valid time of the business indication does not expire.

In some examples, the apparatus further includes a receiving unit 404.

The receiving unit 404 is configured to receive at least one of the business indication and a valid time length of the business indication sent by the access network device.

In some examples, the receiving unit 404 is configured to receive a dedicated signaling sent by the access network device, wherein the dedicated signaling includes at least one of the business indication and the valid time length of the business indication.

Alternatively, the receiving unit 404 is configured to receive a broadcast signaling sent by the access network device, wherein the broadcast signaling includes a business indication.

In some examples, the dedicated signaling includes an RRC reconfiguration message or an RRC connection release message.

In some examples, the acquisition unit 401 is further configured to acquire a default business indication, or acquire a business indication applicable to any Sidelink business in response to receiving no business indication;

acquire a default valid time length, or acquire the valid time length with an infinite length in response to receiving no valid time length.

In some examples, the apparatus further includes a deletion unit 405.

The deletion unit 405 is configured to delete the business indication received from the access network device when a terminal reselects to another cell, in response to that the valid time of the business indication does not expire.

In some examples, the apparatus further includes a deletion unit 405.

The deletion unit 405 is configured to delete the business indication received from the access network device, if the valid time of the business indication expires.

Figure 6:
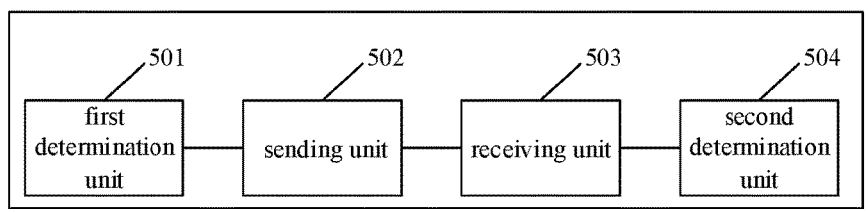
FIG. 6 is a schematic structural diagram of an RRC connection control apparatus according to an example of the present disclosure.

FIG. 6 is a schematic structural diagram of an RRC connection control apparatus according to an example embodiment. The apparatus has the function of realizing the access network device in the above method embodiment. The function may be realized by hardware, or by executing corresponding software through the hardware. As shown in FIG. 6, the apparatus includes a first determination unit 501 and a sending unit 502.

The first determination unit 501 is configured to determine a Sidelink business that can allocate resources based on the network load.

The sending unit 502 is configured to send a business indication, where the business indication indicates a Sidelink business for which the access network device can allocate resources.

In some examples, the business indication includes a list of Proximity QOS Indicators (PQIs) or a list of QOS Flow Indicators (QFIs).

In some examples, the sending unit 502 is configured to send a dedicated signaling, wherein the dedicated signaling includes a business indication; or send a broadcast signaling, wherein the broadcast signaling includes a business indication.

In some examples, the sending unit 502 is further configured to send a dedicated signaling, wherein the dedicated signaling includes a valid time length of the business indication.

In some examples, the dedicated signaling includes an RRC reconfiguration message or an RRC connection release message.

In some examples, the apparatus further includes a receiving unit 503 and a second determination unit 504.

The receiving unit 503 is configured to receive a request for establishing an RRC connection, wherein the request for establishing an RRC connection includes an RRC initiation reason, and the RRC initiation reason is for requesting Sidelink resources.

The second determination unit 504 is configured to determine whether to establish an RRC connection based on the network load.

The sending unit 502 is further configured to send an RRC connection rejection message in response to determining not to establish the RRC connection.

Figure 7:
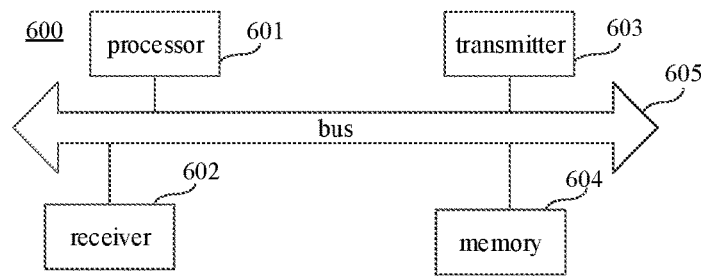
FIG. 7 is a block diagram of a terminal according to an example of the present disclosure.

FIG. 7 is a block diagram of a terminal 600 according to an example embodiment. The terminal 600 may include a processor 601, a receiver 602, a transmitter 603, a memory 604 and a bus 605.

The processor 601 includes one or more processing cores, and the processor 601 executes various functional applications and information processing by running software programs and modules.

The receiver 602 and the transmitter 603 may be implemented as a communication component, which may be a communication chip.

The memory 604 is connected to the processor 601 through the bus 605.

The memory 604 may be configured to store at least one instruction, and the processor 601 is configured to execute the at least one instruction to implement the various steps in the above method embodiments.

Additionally, the memory 604 may be implemented by any type or combination of volatile or non-volatile storage devices including, but not limited to, magnetic or optical disks, electrically erasable programmable Read Only Memory (EEPROM), Erasable Programmable Read Only Memory (EPROM), Static Anytime Access Memory (SRAM), Read Only Memory (ROM), Magnetic Memory, Flash Memory, Programmable Read Only Memory (PROM).

In an example embodiment, a computer-readable storage medium is also provided. The computer-readable storage medium stores at least one instruction, at least one piece of program, code set or instruction set. The at least one instruction, the at least one piece of program, the code set or the instruction set is loaded and executed by the processor to implement the RRC connection control method provided by each of the above method embodiments.

Figure 8:
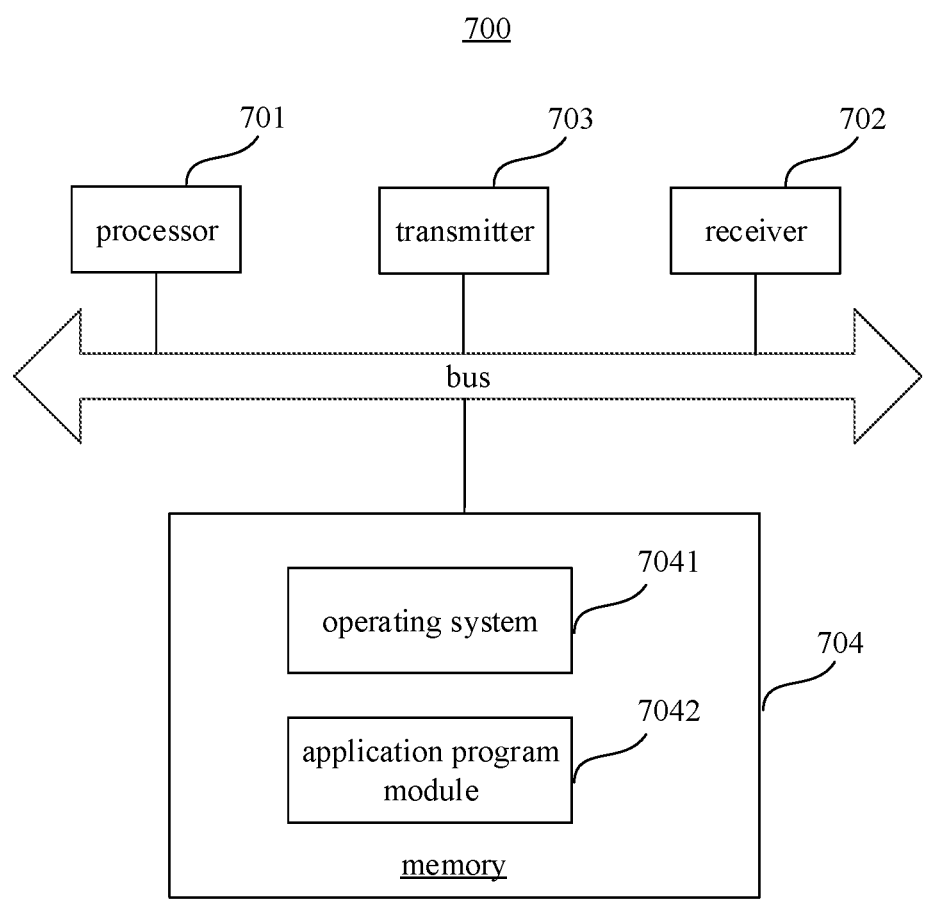
FIG. 8 is a block diagram of an access network device according to an embodiment of the present disclosure.

FIG. 8 is a block diagram of an access network device 700 according to an example embodiment. The access network device 700 may include a processor 701, a receiver 702, a transmitter 703 and a memory 704. The receiver 702, the transmitter 703 and the memory 704 are respectively connected to the processor 701 through a bus.

The processor 701 includes one or more processing cores, and the processor 701 executes the method performed by the access network device in the RRC connection control method provided by the embodiment of the present disclosure by running software programs and modules. The memory 704 may be used to store software programs and modules. Specifically, the memory 704 may store an operating system 7041 and an application program module 7042 needed by at least one function. The receiver 702 is used for receiving communication data sent by other devices, and the transmitter 703 is used for sending communication data to other devices.

In an example embodiment, a computer-readable storage medium is also provided. The computer-readable storage medium stores at least one instruction, at least one piece of program, code set or instruction set. The at least one instruction, the at least one piece of program, the code set or the instruction set is loaded and executed by the processor to implement the RRC connection control method provided by each of the above method embodiments.

An example embodiment of the present disclosure also provides an RRC connection control system. The RRC connection control system includes an access network device and a terminal. The terminal is the terminal provided by the embodiment shown in FIG. 7. The access network device is the access network device provided in the embodiment shown in FIG. 8.

Other embodiments of the disclosure will be apparent to those skilled in the art from consideration of the specification and practice of the disclosure disclosed here. This disclosure is intended to cover any variations, uses, or adaptations of the disclosure following the general principles thereof and including known knowledge or conventional technical means in the art not disclosed in the present disclosure. It is intended that the specification and embodiments are considered as exemplary only.

It will be appreciated that the present disclosure is not limited to the exact construction that has been described above and illustrated in the accompanying drawings, and that various modifications and changes may be made without departing from the scope thereof.

What is claimed is:

1. A Radio Resource Control (RRC) connection control method, comprising:
   acquiring, by a terminal, a service indication in response to a service request, wherein the service indication indicates a service for which an access network device is capable of allocating resources; and
   determining, by the terminal, whether to send a request for establishing an RRC connection to the access network device based on the service indication,
   wherein the method further comprises:
   determining a valid time of the service indication, wherein the valid time of the service indication dynamically varies with network load; and
   determining whether to send the request for establishing the RRC connection to the access network device based on the service indication, in response to that the valid time of the service indication does not expire;
   receiving at least one of the service indication and a valid time length of the service indication sent by the access network device,
   wherein receiving at least one of the service indication and a valid time length of the service indication sent by the access network device comprises:
   receiving a dedicated signaling sent by the access network device, wherein the dedicated signaling comprises at least one of the service indication and the valid time length of the service indication; or
   receiving a broadcast signaling sent by the access network device, wherein the broadcast signaling comprises a service indication.

2. The method according to claim 1, wherein determining whether to send a request for establishing an RRC connection to the access network device based on the service indication comprises:
   acquiring service information of the service;
   determining whether the service information of the service matches the service indication; and
   sending the request for establishing the RRC connection to the access network device in response to that the service information of the service matches the service indication.

3. The method according to claim 2, wherein the service information comprises quality of service information of the service, and the service indication indicates quality of service information of the service for which the access network device is capable of allocating resources.

4. The method according to claim 3, wherein the service indication comprises a list of Proximity QOS Indicators (PQIs) or a list of QOS Flow Indicators (QFIs).

5. The method according to claim 1, wherein the request for establishing the RRC connection comprises an RRC initiation reason, and the RRC initiation reason is for requesting service resources.

6. The method according to claim 1, wherein the dedicated signaling comprises an RRC reconfiguration message or an RRC connection release message.

7. The method according to claim 1, further comprising:
   acquiring a default service indication, or acquiring a service indication applicable to any service in response to receiving no service indication;
   acquiring a default valid time length, or acquiring the valid time length with an unlimited time length in response to receiving no valid time length.

8. The method according to claim 1, further comprising:
   deleting the service indication received from the access network device when a terminal reselects to another cell, in response to that the valid time of the service indication does not expire.

9. A Radio Resource Control (RRC) connection control method, comprising:
   determining, by an access network device, a service that is capable of allocating resources based on network load; and
   sending, by the access network device, a service indication, wherein the service indication indicates a service for which an access network device is capable of allocating resources,
   wherein the method further comprises:
   sending a dedicated signaling, wherein the dedicated signaling comprises a valid time of the service indication, wherein the valid time of the service indication dynamically varies with the network load;
   sending at least one of the service indication and a valid time length of the service indication to a terminal,
   wherein sending at least one of the service indication and a valid time length of the service indication to a terminal comprises:
   sending a dedicated signaling sent to the terminal, wherein the dedicated signaling comprises at least one of the service indication and the valid time length of the service indication; or
   sending a broadcast signaling sent to the terminal, wherein the broadcast signaling comprises a service indication.

10. The method according to claim 9, wherein sending a service indication comprises:
sending a dedicated signaling, wherein the dedicated signaling comprises a service indication; or
sending a broadcast signaling, wherein the broadcast signaling comprises a service indication.

11. The method according to claim 10, wherein the dedicated signaling comprises an RRC reconfiguration message or an RRC connection release message.

12. The method according to claim 9, further comprising:
receiving a request for establishing an RRC connection, wherein the request for establishing an RRC connection comprises an RRC initiation reason, and the RRC initiation reason is for requesting service resources;
determining whether to establish an RRC connection based on the network load; and
sending an RRC connection rejection message in response to determining not to establish the RRC connection.

13. An RRC connection control apparatus, comprising:
a processor; and
a memory for storing executable instructions of the processor,
wherein, the processor is configured to:
acquire a service indication in response to a service request, wherein the service indication indicates a service for which an access network device is capable of allocating resources; and
determine whether to send a request for establishing an RRC connection to the access network device based on the service indication,
wherein the processor is further configured to:
determine a valid time of the service indication, wherein the valid time of the service indication dynamically varies with network load; and
determine whether to send the request for establishing the RRC connection to the access network device based on the service indication, in response to that the valid time of the service indication does not expire;
receive at least one of the service indication and a valid time length of the service indication sent by the access network device, wherein the processor is further configured to:
receive a dedicated signaling sent by the access network device, wherein the dedicated signaling comprises at least one of the service indication and the valid time length of the service indication; or
receive a broadcast signaling sent by the access network device, wherein the broadcast signaling comprises a service indication.

14. The apparatus according to claim 13, wherein, the processor is further configured to:
acquire service information of the service;
determine whether the service information of the service matches the service indication;
send the request for establishing the RRC connection to the access network device in response to that the service information of the service matches the service indication.

15. The apparatus according to claim 13, wherein, the processor is further configured to:
determine a valid time of the service indication; and
determine whether to send the request for establishing the RRC connection to the access network device based on the service indication, in response to that the valid time of the service indication does not expire.

16. A Radio Resource Control (RRC) connection control apparatus, comprising:
a processor; and
a memory for storing executable instructions of the processor,
wherein, the processor is configured to implement the RRC connection control method according to claim 9.

* * * * *